United States Patent
Tanizaki et al.

(10) Patent No.: US 9,726,507 B2
(45) Date of Patent: Aug. 8, 2017

(54) ROUTE CALCULATION SYSTEM, ROUTE CALCULATION METHOD, AND ROUTE CALCULATION PROGRAM

(71) Applicant: AISIN AW CO., LTD., Anjo-shi, Aichi-ken (JP)

(72) Inventors: Daisuke Tanizaki, Okazaki (JP); Tomofumi Shibata, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/766,073

(22) PCT Filed: Mar. 4, 2014

(86) PCT No.: PCT/JP2014/055401
§ 371 (c)(1),
(2) Date: Aug. 5, 2015

(87) PCT Pub. No.: WO2014/156504
PCT Pub. Date: Oct. 2, 2014

(65) Prior Publication Data
US 2015/0377637 A1   Dec. 31, 2015

(30) Foreign Application Priority Data

Mar. 28, 2013  (JP) .................................. 2013-069767

(51) Int. Cl.
*G01C 21/34* (2006.01)
*G08G 1/09* (2006.01)
(Continued)

(52) U.S. Cl.
CPC ......... *G01C 21/34* (2013.01); *G01C 21/3446* (2013.01); *G01C 21/3484* (2013.01);
(Continued)

(58) Field of Classification Search
CPC . G01C 21/34–21/3492; G01C 21/3446; G01C 21/3484; G08G 1/09686; G08G 1/093838; G09B 29/007
See application file for complete search history.

(56) References Cited

U.S. PATENT DOCUMENTS 5,502,640 A * 3/1996 Yagyu ................ G01C 21/3446
340/988
5,845,228 A * 12/1998 Uekawa ............. G01C 21/3446
340/990

(Continued)

FOREIGN PATENT DOCUMENTS

CN       101479570 A    7/2009
EP        0833290 A1    4/1998
(Continued)

OTHER PUBLICATIONS

Oct. 26, 2015 Search Report issued in European Application No. 14776505.1.

*Primary Examiner* — Aaron L Troost
(74) *Attorney, Agent, or Firm* — Oliff PLC

(57) ABSTRACT

Route calculation systems, methods, and programs extract from stored past routes, past routes that at least partly pass through a departure point area and at least partly pass through a destination area, and calculate, for each extracted past route, a new departure point side section route and a new destination side section route. The systems, methods, and programs calculate, for each extracted past route, a new candidate route that sequentially passes through the calculated new departure point side section route, a past section route, and the calculated new destination side section route. The systems, methods, and programs compute a cost of each calculated new candidate route and set the new route as the new candidate route having the smallest computed cost.

7 Claims, 6 Drawing Sheets

(51) Int. Cl.
*G09B 29/00* (2006.01)
*G08G 1/0968* (2006.01)

(52) U.S. Cl.
CPC . *G08G 1/096816* (2013.01); *G08G 1/096838* (2013.01); *G09B 29/007* (2013.01)

(56) References Cited

U.S. PATENT DOCUMENTS

| | | | | |
|---|---|---|---|---|
| 5,931,888 | A * | 8/1999 | Hiyokawa | G01C 21/34 |
| | | | | 701/411 |
| 6,014,607 | A * | 1/2000 | Yagyu | G01C 21/3446 |
| | | | | 340/990 |
| 7,463,972 | B2 | 12/2008 | Yamada et al. | |
| 2008/0215237 | A1* | 9/2008 | Perry | G01C 21/3484 |
| | | | | 701/533 |
| 2009/0005965 | A1* | 1/2009 | Forstall | G01C 21/3484 |
| | | | | 701/533 |
| 2009/0171562 | A1 | 7/2009 | Shimada | |
| 2014/0136104 | A1* | 5/2014 | Spears | G01C 21/3484 |
| | | | | 701/521 |

FOREIGN PATENT DOCUMENTS

| | | |
|---|---|---|
| JP | 2001-153671 A | 6/2001 |
| JP | 2005-098904 A | 4/2005 |
| JP | 2007-107924 A | 4/2007 |
| JP | 2009-250869 A | 10/2009 |
| WO | 2014/156504 A1 | 10/2014 |

* cited by examiner

FIG. 2

[ROUTE INFORMATION DB]

| ROUTE NUMBER | PAST DEPARTURE POINT POSITION | | PAST DESTINATION POSITION | | LINK ID | CALCULATION CONDITION | DATE AND TIME |
|---|---|---|---|---|---|---|---|
| | LATITUDE | LONGITUDE | LATITUDE | LONGITUDE | | | |
| 1 | 35.636 | 139.500 | 35.699 | 139.774 | LK1, ..., LK5, LF1, ..., LF10, LG1, ..., LG10, LH1, ..., LH10, LI1, ..., LI10 | HIGHWAY PRIORITY CALCULATION | MARCH 15, 2013 AM 10:20 |
| 2 | 35.737 | 139.488 | 35.665 | 139.760 | LA1, ..., LK10, LG11, ..., LG20, LH11, ..., LH20, LI11, ..., LI20 | HIGHWAY PRIORITY CALCULATION | MARCH 15, 2013 AM 10:00 |
| 3 | 35.681 | 139.766 | 35.698 | 139.826 | LJ1, ..., LJ15, LI21, ..., LI25 | GENERAL ROAD PRIORITY CALCULATION | MARCH 15, 2013 AM 09:40 |
| ... | ... | ... | ... | ... | ... | ... | ... |

ROUTE CALCULATION SYSTEM, ROUTE CALCULATION METHOD, AND ROUTE CALCULATION PROGRAM

RELATED TECHNICAL FIELDS

Related technical fields include route calculation systems, a route calculation methods, and a route calculation programs.

BACKGROUND

Conventionally, as one of the technologies that calculate a route (hereinafter, referred to as new route) on which a vehicle newly travels, using a route (hereinafter, referred to as past route) on which the vehicle traveled in the past, it has been proposed to calculate the new route using a part including at least a departure point or a destination of the past route when a departure point or a destination of the new route completely matches the departure point or the destination of the past route (for example, refer to Japanese Patent Application Publication No. JP-A-2005-98904).

SUMMARY

However, in the aforementioned conventional technologies, when there is no past route of which the departure point or the destination completely matches the departure point or the destination of the new route, it was not able to extract a past route. In such a case, the new route has to be calculated using a known calculation method, which causes a problem of the processing load required to calculate the new route becoming huge, for example, in a case in which the distance from the departure point to the destination is long.

In view of the aforementioned problem, exemplary embodiments of the broad inventive principles described herein provide a route calculation system, a route calculation method, and a route calculation program that are capable of reducing the process load required to calculate a new route by surely using one or more past routes.

Exemplary embodiments provide, a route calculation system includes: map information storing means for storing map information; route information storing means for storing route information that determines past routes from past departure points to past destinations; and calculating means for calculating a new route from a new departure point to a new destination, wherein the calculating means: when the new departure point and the new destination have been determined, extracts, from the past routes, one or more past routes that at least partly pass through a departure point area and at least partly pass through a destination area based on the map information stored by the map information storing means and the route information stored by the route information storing means, the departure point area being a predetermined range area including the new departure point, the destination area being a predetermined range area including the new destination; calculates, with respect to each of the extracted one or more past routes, a new departure point side section route that is a route from the new departure point to an exit point, the exit point being a point at which the extracted past route intersects with a border of the departure point area on a side of the past destination of the extracted past route; calculates, with respect to each of the extracted one or more past routes, a new destination side section route that is from an entrance point to the new destination, the entrance point being a point at which the extracted past route intersects with a border of the destination area on a side of the past departure point of the extracted past route; calculates, with respect to each of the extracted one or more past routes, a new candidate route that sequentially passes through the calculated new departure point side section route, a past section route, and the calculated new destination side section route, and computes a cost of the calculated new candidate route, the past section route being a route between the exit point and the entrance point on the extracted past route; and calculates the new candidate route of which the computed cost is the smallest as the new route from the new departure point to the new destination.

A route calculation method according to exemplary embodiments includes a calculating step of calculating a new route from a new departure point to a new destination, wherein the calculating step includes: extracting, when the new departure point and the new destination have been determined, based on map information stored by map information storing means storing the map information and route information stored by route information storing means storing the route information that determines past routes from past departure points to past destinations, one or more past routes that at least partly pass through a departure point area and at least partly pass through a destination area from the past routes, the departure point area being a predetermined range area including the new departure point, the destination area being a predetermined range area including the new destination; calculating, with respect to each of the extracted one or more past routes, a new departure point side section route that is a route from the new departure point to an exit point, the exit point being a point at which the extracted past route intersects with a border of the departure point area on a side of the past destination of the extracted past route; calculating, with respect to each of the extracted one or more past routes, a new destination side section route that is from an entrance point to the new destination, the entrance point being a point at which the extracted past route intersects with a border of the destination area on a side of the past departure point of the extracted past route; calculating, with respect to each of the extracted one or more past routes, a new candidate route that sequentially passes through the calculated new departure point side section route, a past section route, and the calculated new destination side section route, and computing a cost of the calculated new candidate route, the past section route being a route between the exit point and the entrance point on the extracted past route; and calculating the new candidate route of which the computed cost is the smallest as the new route from the new departure point to the new destination.

Exemplary embodiments provide a route calculation program that causes a computer to execute the route calculation method described above.

According to the route calculation system, the route calculation method, and the route calculation program described above, when the new departure point and the new destination have been determined, the calculating means: extracts, from the past routes, one or more past routes that at least partly pass through the departure point area and at least partly pass through the destination area; calculates, with respect to each of the extracted one or more past routes, the new candidate route that sequentially passes through the calculated new departure point side section route, the past section route that is a route between the exit point and the entrance point on the extracted past route, and the calculated new destination side section route and computes the cost of the calculated new candidate route; and calculates the new candidate route of which the computed cost is the smallest as the new route. Therefore, as long as the one or more past routes at least partly pass through the departure point area and the destination area, the new route can be calculated using the past routes. Thereby, compared to a case in which new route calculation is performed using past routes only when the new departure point or the new destination of the new route completely matches the past departure points or the past destinations of the past routes, the past routes can be surely utilized. Thus, the process load required to calculate a new route can be surely reduced.

BRIEF DESCRIPTION OF THE DRAWINGS

FIG. 2 shows a configuration example of a route information DB.

DETAILED DESCRIPTION OF EXEMPLARY EMBODIMENTS

Hereinafter, a route calculation system, a route calculation method, and a route calculation program are described in further detail below with reference to an embodiment in conjunction with the accompanying drawings. However, the embodiment described below is not limiting.

Figure 1:
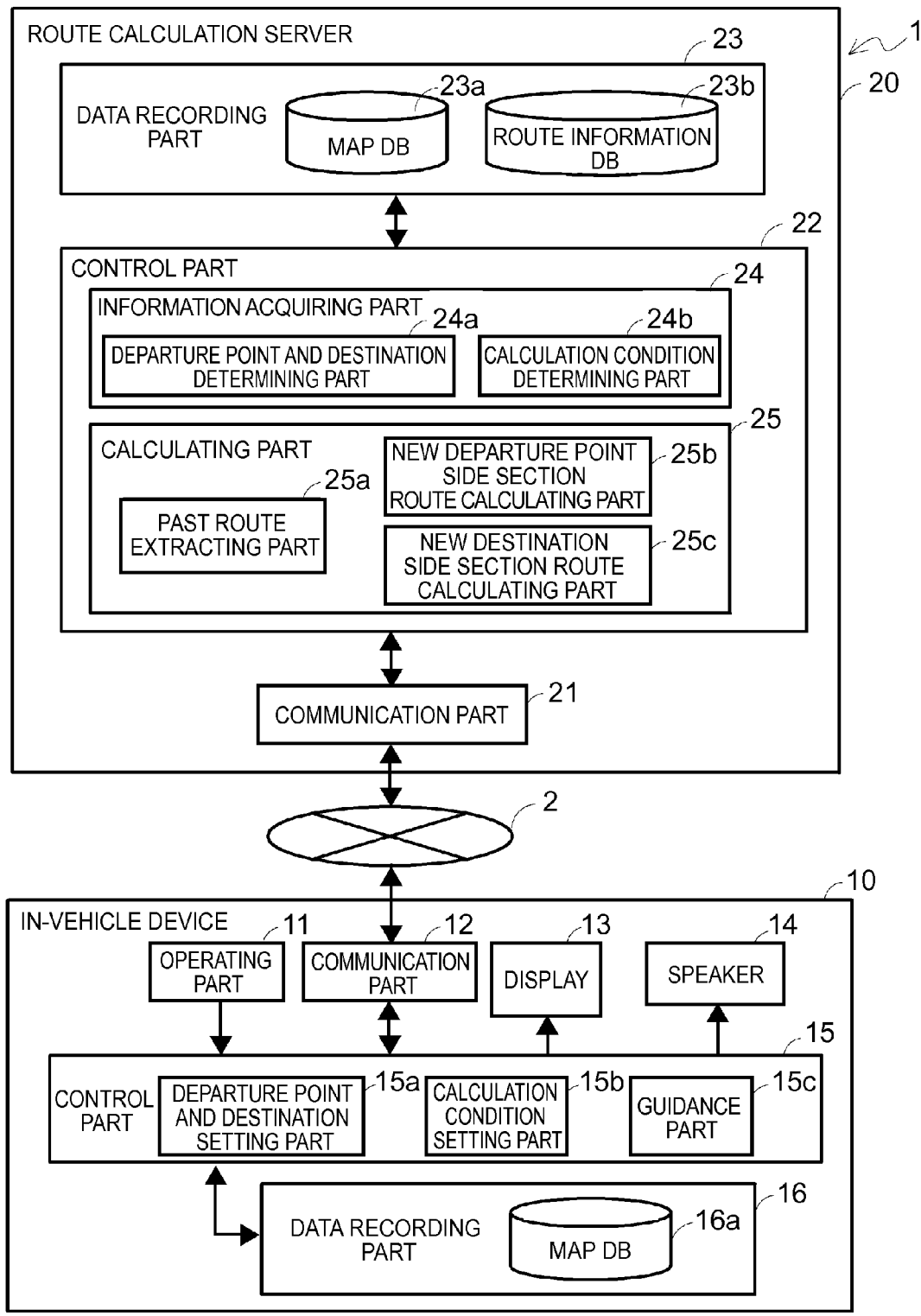
FIG. 1 is a block diagram illustrating a route calculation system according to an embodiment.

Initially, the configuration of the route calculation system according to the present embodiment is explained. FIG. 1 is a block diagram illustrating the route calculation system according to the embodiment. As shown in FIG. 1, the route calculation system 1 is a system that calculates a new route NR from the departure point (hereinafter, referred to as new departure point NS) to the destination (hereinafter, referred to as new destination NG), which is a route on which a vehicle newly travels. The route calculation system 1 is provided with an in-vehicle device 10 installed in a vehicle (not shown), a route calculation server 20 allocated in a base station (not shown), and the like. The route calculation server 20 and the in-vehicle device 10 are communicably connected with each other through a network 2. Here, a single in-vehicle device 10 is shown in FIG. 1. However, in practice, the route calculation system 1 is provided with the in-vehicle devices 10 installed in a plurality of vehicles and the route calculation server 20 that is commonly communicable to the plurality of the in-vehicle devices 10. However, the respective in-vehicle devices 10 of the plurality of vehicles may be configured in the same manner. Therefore, the following description is given for the in-vehicle device 10 installed in a single vehicle (hereinafter, referred to as subject-vehicle), and not given for the in-vehicle devices 10 installed in other vehicles (hereinafter, referred to as other-vehicle). In a case in which it is not necessary to distinguish between the subject-vehicle and the other-vehicles, these are simply referred to as "vehicle." Note that the "vehicle" is a concept including four-wheeled vehicles and the like.

Next, the configuration of the in-vehicle device 10 is described. The in-vehicle device 10 is a device that outputs various kinds of information of the subject-vehicle to the route calculation server 20 and performs various kinds of control based on the information outputted from the route calculation server 20. Specifically, as shown in FIG. 1, the in-vehicle device 10 is provided with an operating part 11, a communication part 12, a display 13, a speaker 14, a control part 15, and a data recording part 16. Note that the in-vehicle device 10 may be configured by, for example, a known navigation device installed in the subject-vehicle, or the like. Therefore, the detailed description is not given.

The operating part 11 is operating means for accepting an input operated by a user of the subject-vehicle. The operating means may be configured by known operating means such as a touch panel, remote operating means such as a remote controller, a hard switch, or the like.

The communication part 12 is communication means for communicating with the route calculation server 20 through the network 2. The communication part 12 may be configured by a known communication part that performs communication using, for example, a FM multiple VICS (registered trademark), an optical VICS, a DCM (Data Communication Module), or a mobile wireless communication network.

The display 13 is display means for displaying various kinds of images based on the control of the control part 15. The display 13 may be configured using, for example, a flat panel display such as a known liquid crystal display and organic EL display.

The speaker 14 is output means for outputting various kinds of audio based on the control of the control part 15. The audio outputted by the speaker 14 is not limited to a specific manner. The audio may be a synthetic audio generated as needed or a previously recorded audio.

The control part 15 is control means for controlling the in-vehicle device 10, specifically a computer provided with a CPU, various kinds of programs recognized and executed on the CPU (including a basic control program such as an OS and an application program to be activated on the OS and realize specific functions), and an internal storage medium such as a RAM for storing the programs and various kinds of data. Particularly, a route calculation program according to the present embodiment is installed in the in-vehicle device 10 through an arbitrary recording storage or the network 2 to substantially form respective parts of the control part 15 (the same is applied to a control part 22 of the route calculation server 20 that is described later). (As used herein, the term "storage medium" is not intended to encompass transitory signals.)

In addition, as shown in FIG. 1, the control part 15 is, in terms of function concept, provided with a departure point and destination setting part 15a, a calculation condition setting part 15b, and a guidance part 15c. The departure point and destination setting part 15a is departure point and destination setting means for setting a new departure point NS and a new destination NG when the operating part 11 accepts an input by a user of the subject-vehicle or the like. Here, "setting of the new departure point NS and the new destination NG" represents that, for example, when the addresses of the new departure point NS and the new destination NG are input through the operating part 11, map information stored in a map DB 16a of the data recording part 16 described later is referred and the positions of the new departure point NS and the new destination NG (specifically, latitude and longitude) are set. The calculation condition setting part 15b is calculation condition setting means for setting a calculation condition (hereinafter, referred to as new calculation condition) of a new route NR upon an input by the user of the subject-vehicle having been accepted by the operating part 11. The "calculation condition" here is a calculation condition that is given priority in calculating a route. The "calculation condition" is a concept including, for example, a highway priority calculation in which national highways (hereinafter, referred to as highway) are given priority in calculating a route, a toll road priority calculation in which highways and toll roads are given priority in calculating a route, and a general road priority calculation in which general national roads (hereinafter, referred to as national roads) and prefectural roads are given priority in calculating a route. The guidance part 15c is guidance means for providing guidance to the user of the subject-vehicle through the display 13 or the speaker 14 serving as outputting means.

The data recording part 16 is recording means for recording programs necessary for the operation of the in-vehicle device 10 and various kinds of data. For example, the data recording part 16 is configured using a hard disk (not shown) as an external storage device. However, in place of or in combination with the hard disk, other recording medium including a magnetic recording medium such as a magnetic disk or an optical recording medium such as a DVD and a Blu-ray disk may be utilized (the same is applied to a data recording part 23 of the route calculation server 20 that is described later).

In addition, the data recording part 16 is provided with the map database 16a (hereinafter, database is referred to as "DB"). The map DB 16a is map information storing means for storing map information. The "map information" here is information necessary to determine various kinds of positions including roads, road structures, facilities, and the like. The "map information" is configured to include, for example, node data (node numbers, coordinates) regarding nodes set on roads, link data (link ID, link names, connected node numbers, road coordinates, road types (for example, highways, toll roads, national roads, prefectural roads, city/village roads, and the like) regarding links set on roads, feature data (traffic lights, road signs, guard rails, facilities, and the like), geographic data, and the like (the same is applied to a map DB 23a of the route calculation server 20 that is described later).

Next, the configuration of the route calculation server 20 is explained. The route calculation server 20 is a device that calculates the new route NR from the new departure point NS to the new destination NG. Specifically, as shown in FIG. 1, the route calculation server 20 is provided with a communication part 21, the control part 22, and the data recording part 23.

The communication part 21 is communication means for communicating with the in-vehicle device 10 through the network 2. Specifically, the communication part 21 receives various kinds of information outputted from the in-vehicle device 10 of the vehicle through the network 2 and transmits the various kinds of information to the in-vehicle device 10 of the vehicle. The communication part 21 may be configured as a known communication part that performs communication using, for example, a FM multiple VICS, an optical VICS, a DCM (Data Communication Module), or a mobile wireless communication network.

The control part 22 is control means for controlling the route calculation server 20. The control part 22 is, in terms of function concept, provided with an information acquiring part 24 and a calculating part 25.

The information acquiring part 24 is information acquiring means for acquiring information regarding the new route NR. Here, an acquiring method of information regarding the new route NR by the information acquiring part 24 is not limited. For example, the information acquiring part 24 may acquire the information from the in-vehicle device 10 of the vehicle through the communication part 21 as necessary and records the information in the data recording part 23 in a volatile or non-volatile manner. The information acquiring part 24 is further provided with a departure point and destination determining part 24a and a calculation condition determining part 24b. The departure point and destination determining part 24a is a departure point and destination determining means for determining the new departure point NS and the new destination NG based on setting data received from the departure point and destination setting part 15a of the in-vehicle device 10 through the communication part 21. The calculation condition determining part 24b is calculation condition determining means for determining a new calculation condition based on setting data received from the calculation condition setting part 15b of the in-vehicle device 10 through the communication part 21.

The calculating part 25 is calculating means for calculating the new route NR from the new departure point NS to the new destination NG. The calculating part 25 is further provided with a past route extracting part 25a, a new departure point side section route calculating part 25b, and a new destination side section route calculating part 25c. The past route extracting part 25a is past route extracting means for extracting specific past routes R from the past routes R stored in a route information DB 23b that is described later. The new departure point side section route calculating part 25b is new departure point side section route calculating means for calculating a new departure point side section route NSR that is described later. The new destination side section route calculating part 25c is new destination side section route calculating means for calculating a new destination side section route NGR that is described later. The processes executed by the respective components of the control part 22 are described in detail later.

The data recording part 23 is recording means for recording programs necessary for the operation of the route calculation server 20 and various kinds of data. The data recording part 23 is provided with the map DB 23a and the route information DB 23b.

The map DB 23a stores map information. Here, the map information is configured to include the map information stored in the map DB 16a and section part data (section part numbers, border coordinates of the section parts, and the like) regarding the respective section parts that are previously set on the map. Here, the "section part" corresponds to an area with a predetermined size that is sectioned in a reticular pattern by a plurality of first virtual borderlines along a predetermined direction (for example, a direction of north-south, etc.) with respect to the map displayed on the display 13 and a plurality of second virtual border lines along a predetermined direction (for example, a direction of east-west, etc.) that is perpendicular to the first virtual border lines. For example, the "section part" corresponds to an area being sectioned by a side of a length on the map corresponding to an actual distance of 5 km and a side of a length on the map corresponding to an actual distance of 7 km.

The route information DB 23b is route information storing means for storing route information and calculation condition information. The "route information" here is information that determines the past routes R from the departure points (hereinafter, referred to as past departure points S) to the destinations (hereinafter, referred to as past destinations G) that are routes traveled by the vehicle in the past. In addition, the "calculation condition information" is information that determines the calculation conditions of the past routes R. FIG. 2 shows a configuration example of the route information DB 23b. As shown in FIG. 2, the route information DB 23b is configured such that an item "route number," an item "past departure point position," an item "past destination position," and an item "link ID," an item "calculation condition," and an item "date and time" are mutually associated with information corresponding to the respective items. The information stored corresponding to the item "route number" is information that determines route numbers of the past routes R among the route information. The information stored corresponding to the item "past departure point position" is information that determines positions of the past departure points S among the route information. Specifically, the information includes coordinates of the past departure points S including latitudes of the past departure points S that are information stored corresponding to an item "latitude" and longitudes of the past departure points S that are information stored corresponding to an item "longitude." The information stored corresponding to the item "past destination position" is information that determines positions of the past destinations G among the route information. Specifically, the information includes coordinates of the past destinations G including latitudes of the past destinations G that are information stored corresponding to the item "latitude" and longitudes of the past destinations G that are information stored corresponding to the item "longitude." The information stored corresponding to the item "link ID" is information that determines link IDs of links included in the past routes R among the route information. The information stored corresponding to the item "calculation condition" is calculation condition information. The information stored corresponding to the item "date and time" is information that determines dates and times when the route information was recorded in the route information DB 23b.

In FIG. 1, the network 2 is a communication network that enables the in-vehicle devices 10 installed in a plurality of vehicles to mutually communicate with the route calculation server 20 that is common thereto. For example, the network 2 may be configured using a known movable communication network.

Figure 3:
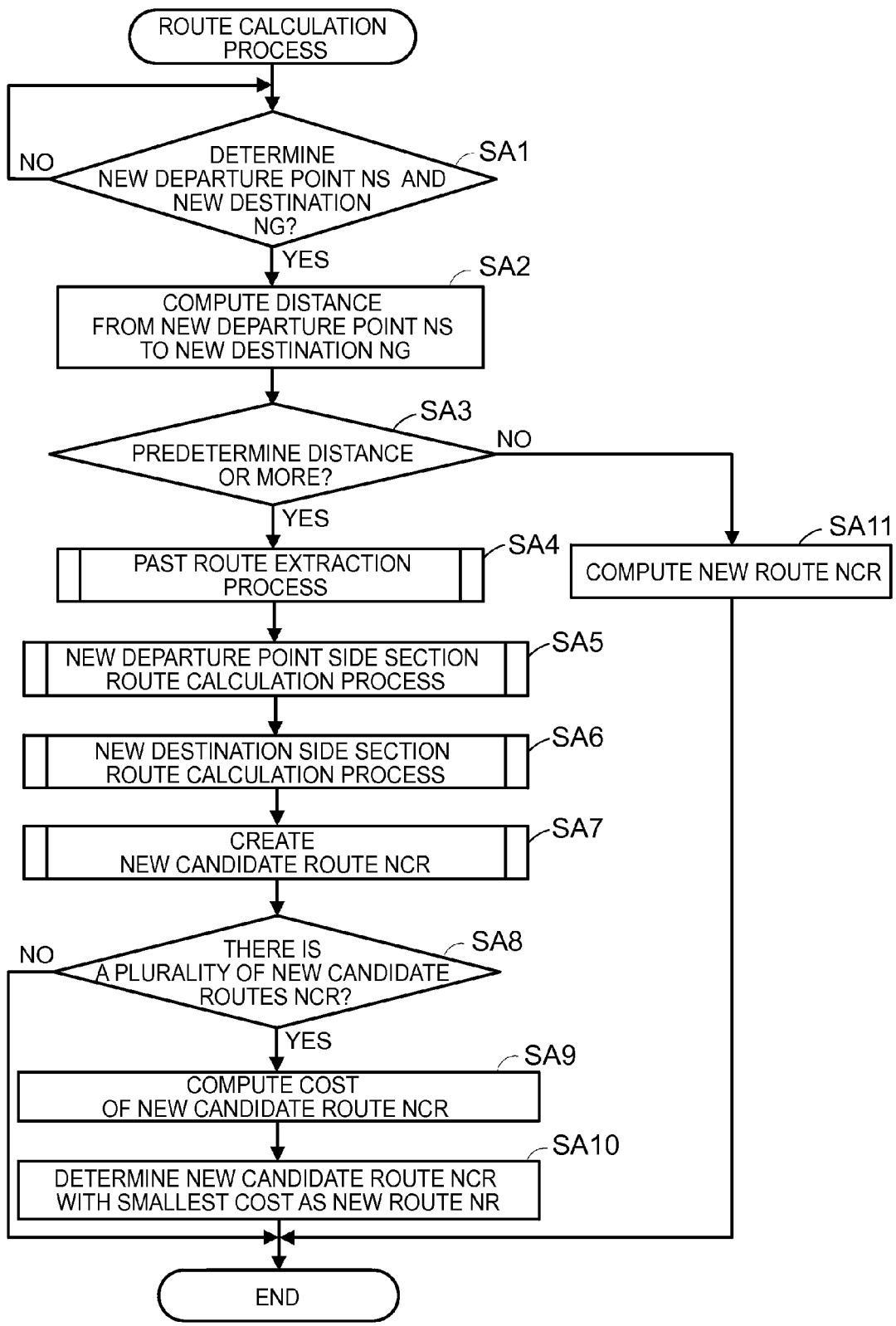
FIG. 3 is a flow chart of a route calculation process according to the present embodiment.
Figure 4:
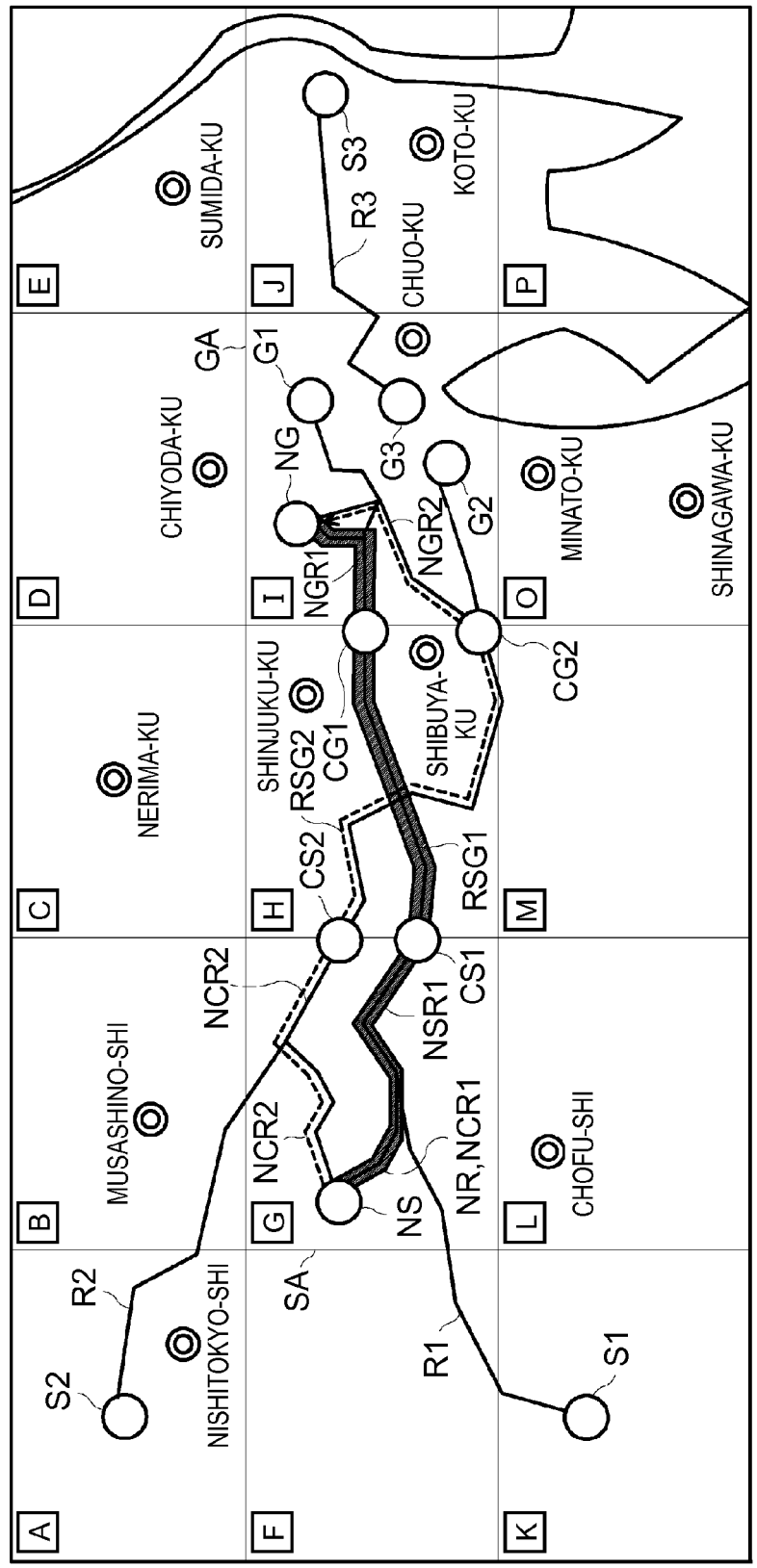
FIG. 4 shows an exemplary map including a new departure point and a new destination that are target for the route calculation process.

Next, a route calculation process executed by the route calculation server 20 configured as above is explained. FIG. 3 is a flow chart of the route calculation process according to the present embodiment (hereinafter, step is referred to as "S" in the explanation for each process). FIG. 4 shows an exemplary map including the new departure point NS and the new destination NG that are target for the route calculation process. Here, in FIG. 4, border lines sectioning a plurality of section parts (a section part A to a section part P shown in FIG. 4, etc.) are represented by thin lines (section numbers are indicated at the upper-left corners); the new route NR is represented by a thick line; the past routes R are represented by thick lines different from the thick line representing the new route NR; and a new candidate route NCR2 described later is represented by a dashed line. The route calculation process is a process that calculates the new route NR from the new departure point NS to the new destination NG. For example, the route calculation process is activated after the in-vehicle device 10 and the route calculation server 20 are powered.

When the route calculation process is activated, the control part 22 waits until the departure point and destination determining part 24a determines the new departure point NS and the new destination NG based on the setting data of the departure point and destination setting part 15a received from the in-vehicle device 10 of the vehicle and the calculation condition determining part 24b determines the new calculation condition based on the setting data received from the calculation condition setting part 15b of the in-vehicle device 10 of the vehicle through the communication part 21 (SA1: NO).

Here, when the new departure point NS and new destination NG have been determined and the new calculation condition has been determined (SA1: YES), the control part 22 performs processes at SA2 and SA3 to determine whether to perform calculation using the route information stored in the route information DB 23b, that is, whether to perform calculation using the past routes R.

Initially, the calculating part 25 computes a distance from the new departure point NS to the new destination NG based on the new departure point NS and the new destination NG determined at SA1 (SA2). Specifically, the calculating part 25 computes a shortest distance from the new departure point NS to the new destination NG determined at SA1. For example, as shown in FIG. 4, when it have been determined that the new departure point NS is home and the new destination NG is company, if the position of the new departure point NS is latitude: 35.702 and longitude: 139.560 and the position of the new destination NG is latitude: 35.691 and longitude: 139.735, the shortest distance between the new departure point NS and the new destination NG is computed as follows: the shortest distance between the new departure point NS and the new destination NG=equator radius×$\cos^{-1}$ (sin(the latitude of the new departure point NS)×sin(the latitude of the new destination NG)+ cos(the longitude of the new departure point NS)×cos(the longitude of the new destination NG)×cos((the latitude of the new destination NG) (the latitude of the new departure point NS))=6378.137 km×$\cos^{-1}$(sin(35.702)×sin(35.691)+ cos(139.560)×cos(139.735)×cos((35.691)−(35.702))=15.8 km.

Referring back to FIG. 3, the calculating part 25 determines whether the distance from the new departure point NS to the new destination NG computed at SA2 is equal to or longer than a predetermined distance (SA3). Here, the "predetermined distance" is not limited to a specific value. For example, the "predetermined distance" is set to a shortest distance (for example, 10 km or longer) among the distances from the new departure point NS to the new destination NG, which is likely to make the process load in the calculation of the new route NR using a known route calculation method such as Dijkstra algorism greater than the process load in the calculation of the new route NG using one or more past routes, when compared. For example, as shown in FIG. 4, when the distance from the new departure point NS to the new destination NG is 15.8 km, it is determined that the distance from the new departure point NS to the new destination NG is equal to or longer than the predetermined distance.

Referring back to FIG. 3, when the distance from the new departure point NS to the new destination NG is not equal to or greater than the predetermined distance (SA3: NO), the calculating part 25 calculates the new route NR using a known route calculation method based on the new departure point NS and the new destination NG determined at SA1 and the map information stored in the map DB 23a (SA11). That is, the calculating part 25 calculates the new route NR without using the past routes R. In such calculation, the new route NR is calculated in a known route calculation method. In such case, the process load is relatively small because of a narrow calculation area for the new route NR. In addition, it is possible to prevent the calculation accuracy from being lowered and the process load from being increased compared to the case in which the new route NR is calculated using the past routes R. Thereafter, the control part 22 terminates the route calculation process.

On the other hand, when the distance from the new departure point NS to the new destination NG is equal to or longer than the predetermined distance (SA3: YES), the control part 22 sequentially activates a past route extraction process (SA4), a new departure point side section route calculation process (SA5), a new destination side section route calculation process (SA6). That is, the new route NR is calculated using the past routes R.

Figure 5:
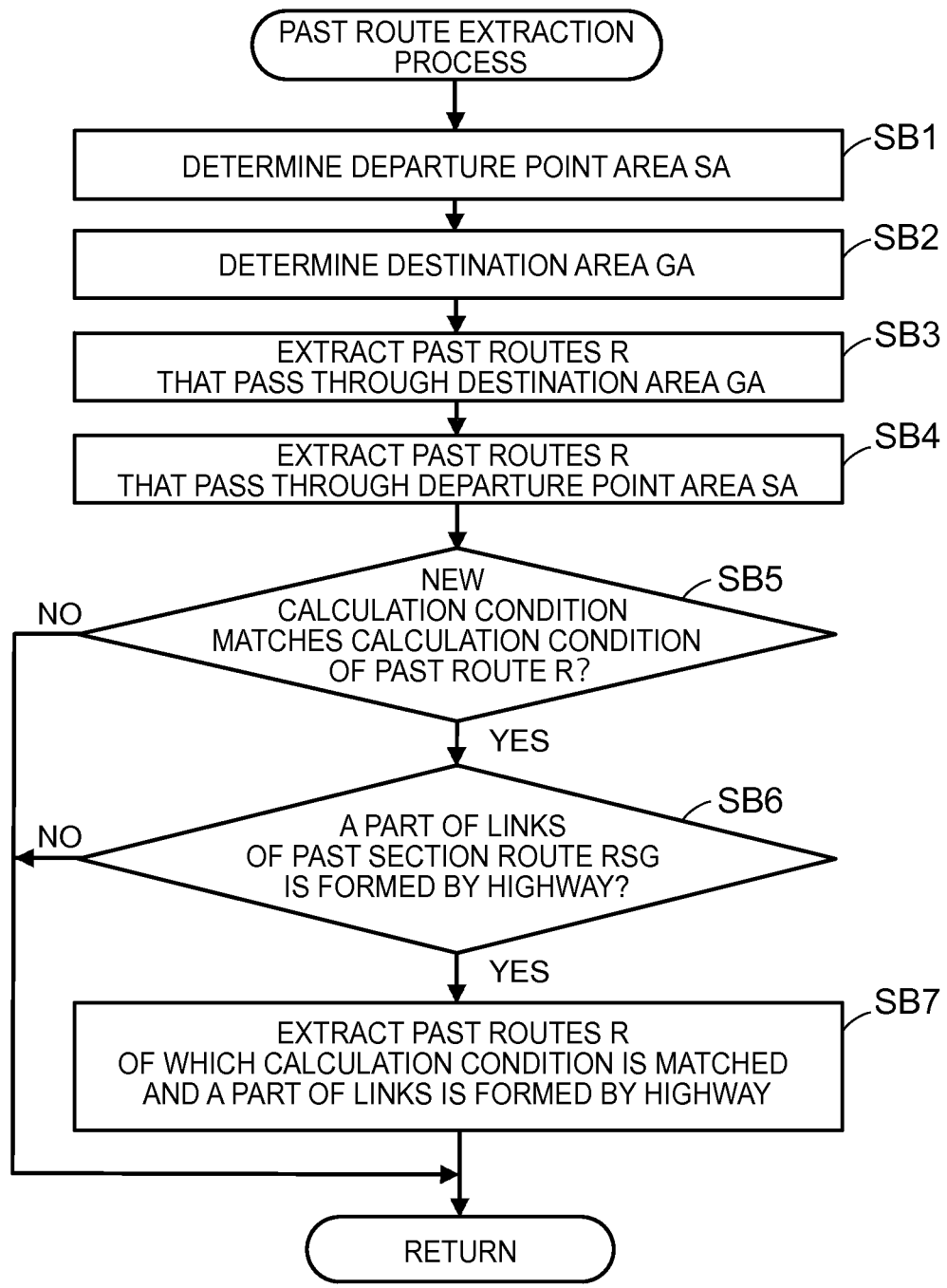
FIG. 5 is a flow chart of a past route extraction process.

Initially, the past route extraction process (SA4) is explained. FIG. 5 is a flow chart of the past route extraction process. The past route extraction process is a process that extracts specific past routes R from the past routes R stored in the route information DB 23b.

When the past route extraction process is activated, the past route extracting part 25a determines a departure point area SA that is a predetermined range area including the new departure point NS, based on the new departure point NS determined at SA1 and the map information stored in the map DB 23a (SB1). Specifically, the past route extracting part 25a refers to the map information stored in the map DB 23a, determines the section part including the new departure point NS from a plurality of section parts on the map, and determines the determined section part as the departure point area SA. For example, as shown in FIG. 4, when the position of the new departure point NS is latitude: 35.702 and longitude: 139.560, the section part G including the new departure point NS is determined from the section parts A to O.

Referring back to FIG. 5, the past route extracting part 25a determines a destination area GA that is a predetermined range area including the new destination NG, based on the new destination NG determined at SA1 and the map information stored in the map DB 23a (SB2). Specifically, the past route extracting part 25a refers to the map information stored in the map DB 23a, determines the section part including the new destination NG from a plurality of section parts on the map, and determines the determined section part as the destination area GA. For example, as shown in FIG. 4, when the position of the new destination NG is latitude: 35.691 and longitude: 139.735, the section part I including the new destination NG is determined from the section parts A to O.

Referring back to FIG. 5, the past route extracting part 25a extracts one or more past routes R that at least partly pass through the destination area GA from the past routes R, based on the destination area GA determined at SB2, the map information stored in the map DB 23a, and the route information stored in the route information DB 23b (SB3). Specifically, the past route extracting part 25a refers to the map information stored in the map DB 23a and determines one or more link IDs existing in the destination area GA. Then, the past route extracting part 25a refers to the route information stored in the route information DB 23b and extracts one or more past routes R corresponding to the route information including at least a part of the determined link IDs.

The route information to be extracted from route information DB 23b is not limited. For example, only the route information corresponding to the past routes calculated for a predetermined period of time (for example, one hour, etc.) just before calculating the new route NR may be extracted such that the new route NR according to the situation at the time of calculation can be calculated by extracting fresh route information. Specifically, as shown in FIGS. 2 and 4, when the destination area GA is the section part I, the link IDs LI1, . . . LI10, LI11, . . . LI20, LI21, . . . LI25, . . . LI100 that exist in the section part I are determined. Among the route information calculated during one hour just before the route calculation process start (for example, 10:30 am, Mar. 15, 2013, etc.) and stored in the route information DB 23b, when the route information corresponding to a past route R1 includes the above-determined link IDs LI1, . . . LI10, the route information corresponding to a past route R2 includes the above-determined link IDs LI11, . . . LI20, and the route information corresponding to a past route R3 includes the above-determined link IDs LI21, . . . LI25, the past routes R1 to R3 are extracted.

Referring back to FIG. 5, the past route extracting part 25a extracts one or more past routes R that at least partly pass through the departure point area SA from the past routes R extracted at SB3, based on the departure point area SA determined at SB1, the past routes R extracted at SB3, the map information stored in the map DB 23a, and the route information stored in the route information DB 23b (SB4). Specifically, the past route extracting part 25a refers to the map information stored in the map DB 23a and determines link IDs existing in the departure point area SA. Thereafter, the past route extracting part 25a refers to the route information stored in the route information DB 23b and extracts one or more past routes R corresponding to the route information including at least a part of the above-determined IDs from the past routes R extracted at SB3. For example, as shown in FIGS. 2 and 4, when the departure point area SA is the section part G, the link IDs LG1, . . . LG10, LG11, . . . LG20, . . . LG70 that exist in the section part G are determined. If the past routes R passing through the destination area GA is the past routes R1 to R3, when the route information corresponding to the past route R1 includes the above-determined link IDs LG1, . . . LG11, the route information corresponding to the past route R2 includes the above-determined link IDs LG11, . . . LG20, the past routes R1 to R2 are extracted.

Referring back to FIG. 5, in order to extract past routes R that match a desired condition (for example, vehicle user's needs, etc.) from the past routes R extracted at SB3 and SB4, the control part 22 performs the processes SB5 to SB7.

Initially, the past route extracting part 25a determines based on the new calculation condition determined at SA1 and the route information corresponding to the past routes R extracted at SB4 whether the new calculation condition matches the calculation condition of each of the past routes R (SB5). For example, as shown in FIGS. 2 and 4, when the new calculation condition is highway priority calculation and the calculation conditions of the past routes R1 and R2 that pass through the departure point area SA and the destination area GA are highway priority calculation, it is determined that the new calculation condition matches the calculation conditions of the past routes R1 and R2.

When it has been determined that the new calculation condition does not match the calculation conditions of any past routes R (SB5: NO), the control part 22 terminates the past route extraction process without performing the processes at SB6 and SB7. In such case, the past routes R extracted at SB4 are treated as the past routes R that are utilized in the subsequent processes.

On the other hand, when the new calculation condition matches the calculation condition of a past route R (SB5: YES), the past route extracting part 25a determines based on the map information stored in the map DB 23a and the route information stored in the route information DB 23b whether at least a part of a plurality of links on a route (hereinafter, referred to as past section route RSG) between an exit point CS that is described later and an entrance point CG that is described later of the past route R determined as matching the new calculation condition at SB5 is formed by a link whose road type is highway (SB6). Specifically, the past route extracting part 25a determines the exit point CS and the entrance point CG in the same manner as SC1 and SD1 that are described later, and determines, based on the determined exit point CS and entrance point CG, the part between the exit point CS and the entrance point CG on the past route R as the past section route RSG. Next, the past route extracting part 25a refers to the road types of the link data in the map information stored in the map DB 23a and determines whether the road types of a plurality of links on the past section route RSG include a highway. When the road types of a plurality of links on the past section route RSG include a highway, the past route extracting part 25a determines that a part of the links on the past section route RSG is formed by a link whose road type is highway. When the road types of a plurality of links on the past section route RSG do not include a highway, the past route extracting part 25a determines that any part of the links on the past section route RSG is not formed by a link whose road type is highway.

When it has been determined that any part of the links on the past section route RSG is not formed by a link whose road type is highway (SB6: NO), the past route extracting part 25a extracts one or more past routes R whose calculation conditions have been determined to match the new calculation condition at SB5 and terminates the route determination process without performing the process at SB7. In such case, the one or more past routes R extracted in this process are treated as the past routes R that are utilized in the subsequent processes.

On the other hand, when it has been determined that a part of the links on the past section route RSG is formed by a link whose road type is highway (SB6: YES), the past route extracting part 25a extracts, based on the determination results at SB6, the past route R whose calculation condition matches the new calculation condition and which is formed by a link whose road type is highway (SB7). For example, as shown in FIGS. 2 and 4, when the past routes R1 and R2 pass through the departure point area SA and the destination area GA, if the road types of the link IDs LF1 to LI5 that are included in the route information corresponding to the past route R1 are highway and the road types of the link IDs LH7 to LI18 that are included in the route information corresponding to the past route R2 are highway, the past routes R1 and R2 are extracted. Then, the past route extraction process terminates and the procedure returns to SA4 that is shown in FIG. 3.

Figure 6:
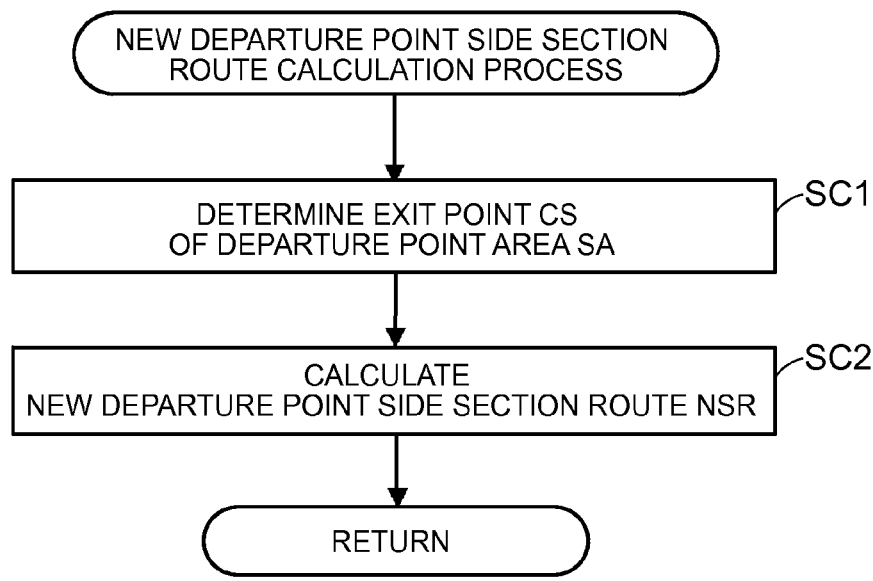
FIG. 6 is a flow chart of a new departure point side section route calculation process.

Next, the new departure point side section route calculation process (SA5) shown in FIG. 3 is explained. FIG. 6 is a flow chart of the new departure point side section route calculation process. The new departure point side section route calculation process is a process that calculates a new departure point side section route NSR that is described later. When a plurality of past routes R have been extracted in the past route extraction process, the new departure point side section route NSR is calculated with respect to each of the past routes R.

When the new departure point side section route calculation process is activated, the new departure point side section route calculating part 25b determines a point (hereinafter, referred to as exit point CS) at which the past route R intersects with a border of the departure point area SA on a side of the past destination G of the past route R based on the past route R extracted at SA4, the departure point area SA determined at SB1, the map information stored in the map DB 23a, and the route information stored in the route information DB 23b (SC1), as shown in FIG. 6. Specifically, the new departure point side section route calculating part 25b refers to the map information stored in the map DB 23a and the route information stored in the route information DB 23b, and determines a link which intersects with the border of the departure point area SA among links included in the past route R on the side of the past destination G of the past route R. The new departure point side section route calculating part 25b refers to the map information stored in the map DB 23a and determines, as the exit point CS, a coordinate at which the determined link intersects with the border of the departure point area SA among the coordinates corresponding to the determined link. For example, as shown in FIG. 4, when the departure point area SA is the section part G and the past routes R extracted in the past route extraction process are the past routes R1 and R2, LG 10 that is a link on the past route R1 which intersects with a border of the section part G on the side of the past destination G1 of the past route R1 is determined and the coordinate of latitude: 35.681 and longitude: 139.627 at which the past route R1 intersects with the border of the section part G among the road coordinates corresponding to the determined link LG10 is determined as the exit point CS1 corresponding to the past route R1. In addition, LG 20 that is a link on the past route R2 which intersects with the border of the section part G on the side of the past destination G2 of the past route R2 is determined and the coordinate of latitude: 35.668 and longitude: 139.623 at which the past route R2 intersects with the border of the section part G among the road coordinates corresponding to the determined link LG20 is determined as the exit point CS2 corresponding to the past route R2.

Referring back to FIG. 6, the new departure point side section route calculating part 25b calculates the new departure point side section route NSR that is a route from the new departure point NS determined at SA1 to the exit point determined at SC1 using a known route calculation method based on the map information stored in the map DB 23a (SC2). For example, as shown in FIG. 4, when the new departure point NS is home and the exit points CS of the departure point area SA are the exit points CS1 and CS2, the new departure point side section route NSR1 from the new departure point NS to the exit point CS1 and the new departure point side section route NSR2 from the new departure point NS to the exit point CS2 are determined. Then, the new departure point side section route calculation process terminates and the procedure returns to SA5 shown in FIG. 3.

Figure 7:
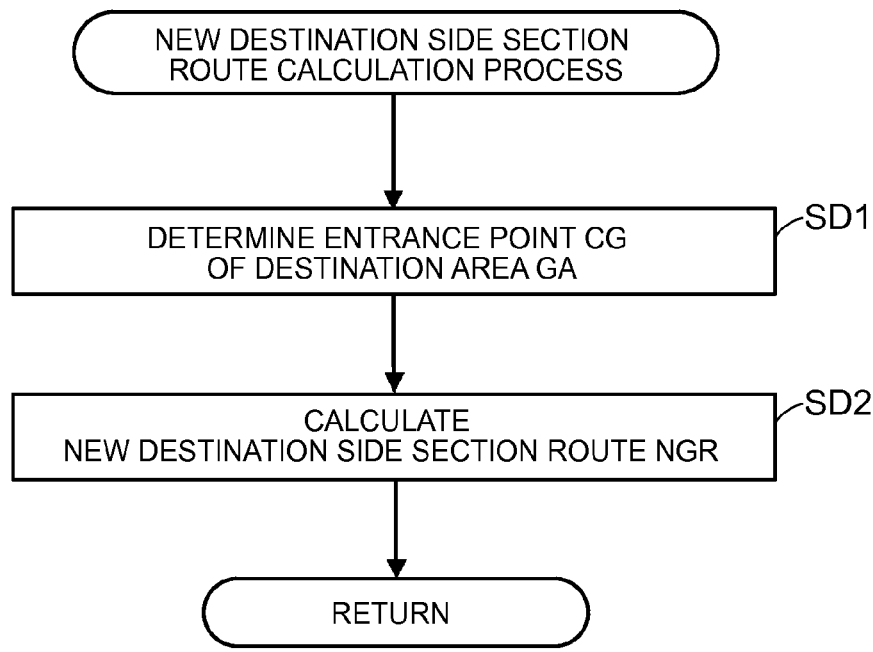
FIG. 7 is a flow chart of a new destination side section route calculation process.

Next, the new destination side section route calculation process shown in FIG. 3 is explained (SA6). FIG. 7 is a flow chart of the new destination side section route calculation process. The new destination side section route calculation process is a process that calculates a new destination side section route NGR that is described later. When a plurality of past routes have been extracted in the past route extraction process, the new destination side section routes NGR are calculated with respect to each of the respective past routes R.

When the new destination side section route calculation process is activated, the new destination side section route calculating part 25c determines a point (hereinafter, referred to as entrance point CG) at which the past route R intersects with a border of the destination area GA on a side of the past departure point S of the past route R based on the past route R extracted at SA4, the destination area GA determined at SB2, the map information stored in the map DB 23a, and the route information stored in the route information DB 23b (SD1), as shown in FIG. 7. Specifically, the new destination side section route calculating part 25c refers to the map information stored in the map DB 23a and the route information stored in the route information DB 23b, and determines a link which intersects with a border of the destination area GA among links included in the past route R on the side of the past departure point S of the past route R. The new destination side section route calculating part 25c refers to the map information stored in the map DB 23a and determines, as the entrance point CG, a coordinate at which the determined link intersects with the border of the destination area GA among the road coordinates corresponding to the determined link. For example, as shown in FIG. 4, when the destination area GA is the section part I and the past routes R extracted in the past route extraction process are the past routes R1 and R2, LI1 that is a link on the past route R1 which intersects with the border of the section part I on the side of the past departure point S1 of the past route R1 is determined and the coordinate of latitude: 35.669 and longitude: 139.704 at which the past route R1 intersects with the border of the section part I among the road coordinates corresponding to the determined link LI1 is determined as the entrance point CG1 corresponding to the past route R2. In addition, LI11 that is a link on the past route R2 which intersects with the border of the section part I on the side of the past departure point S2 of the past route R2 is determined and the coordinate of latitude: 35.658 and longitude: 139.701 at which the past route R2 intersects with the border of the section part I among the road coordinates corresponding to the determined link LI11 is determined as the entrance point CG2 corresponding to the past route R2.

Referring back to FIG. 7, the new destination side section route calculating part 25c calculates the new destination side section route NGR that is a route from the entrance point CG determined at SD1 to the new destination NG determined at SA1 using a known route calculation method based on the map information stored in the map DB 23a (SD2). For example, as shown in FIG. 4, when the new destination NG is home and the entrance point CG of the destination area GA is the entrance points CG1 and CG2, the new destination side section route NGR1 from the entrance point CG1 to the new destination NG and the new destination side section route NGR2 from the entrance point CG2 to the new destination NG are determined. Then, the new destination side section route calculation process terminates and the procedure returns to SA6 shown in FIG. 3.

Referring back to FIG. 3, the calculating part 25 calculates (creates), based on each past route extracted at SA4, the new departure point side section route NSR calculated at SA5, the new destination side section route NGR calculated at SA6, the past section route RSG determined at SB5, and the map information stored in the map DB 23a, a new candidate route NCR that is a route that sequentially passes through the new departure point side section route NSR, the past section route RSG, and the new destination side section route NGR (SA7). Specifically, the calculating part 25 refers to the map information stored in the map DB 23a and calculates the new candidate route NCR that sequentially passes through the new departure point side section route NSR, the past section route RSG corresponding to the exit point CS of the new departure point side section route NSR, the new destination side section route NGR corresponding to the entrance point CG of the past section route RSG. For example, as shown in FIG. 4, when the past routes R extracted in the past route extraction process are the past routes R1 and R2, the new departure point side section routes NSR calculated in the new departure point side section route calculation process are new departure point side section routes NSR1 and NSR2, and the new destination side section routes NGR calculated in the new destination side section route calculation process are the new destination side section routes NGR1 and NGR2, the new candidate route NCR1 is calculated as a route that passes through the new departure point side section route NSR1, the part (that is, a past section route RSG1) from the exit point CS1 to the entrance point CG1 on the past route R1, and the new destination side section route NGR1. The new candidate route NCR2 is calculated as a route that passes through the new departure point side section route NSR2, the part (that is, a past section route RSG2) from the exit point CS2 to the entrance point CG2 on the past route R2, and the new destination side section route NGR2.

Referring back to FIG. 3, in order to determine the new route NR from the new candidate routes NCR created at SA7, the control part 22 performs the processes SA8 to SA10.

Initially, the calculating part 25 determines whether there is a plurality of new candidate routes NCR created at SA7 (SA8). For example, as shown in FIG. 4, when the new candidate routes NCR are the new candidate routes NCR1 and NCR2, it is determined that there is a plurality of new candidate routes NCR.

Referring back to FIG. 3, when it has been determined that there is not a plurality of new candidate routes NCR (SA8: NO), the calculating part 25 determines the one new candidate route NCR as the new route NR. Then, the control part 22 terminates the route calculation process without performing the processes at SA9 and SA10.

On the other hand, when it has been determined that that there is a plurality of new candidate routes NCR (SA8: YES), the calculating part 25 computes a cost of each new candidate route NCR using a known cost computing method based on the new candidate route NCR calculated at SA7, the map information stored in the map DB 23a, and the route information stored in the route information DB 23b (SA9). Regarding the computing of the cost of the new candidate route NCR, for example, the information of each link on the new candidate route NCR is acquired from the map DB 23a, the cost of each link is accumulated for each new candidate route NCR, and the cost of the new candidate route NCR is computed. In such case, the cost of each link is computed in consideration of, for example, the road type, the number of lanes, the number of intersections, or the occurrence frequency of congestion, etc., in addition to the length of the link.

The calculating part 25 determines, as the new route NR, the new candidate route NCR with the smallest cost among the costs of the respective new candidate routes computed at SA9 (SA10). For example, as shown in FIG. 4, when the new candidate routes NCR are the new candidate routes NCR1 and NCR2, if the cost of the new candidate route NCR1 is smaller than that of the new candidate route NCR2, the new candidate route NCR1 is determined as the new route NR. In such calculation, the new route NR is calculated using the past routes R. Therefore, the process load can be reduced, compared to a case in which the new route NR is calculated in a known route calculation method. Then, the route calculation is terminated.

The new route NR calculated in such manner is sent to the in-vehicle device 10 of a predetermined vehicle through the network 2. The guidance part 15c of the in-vehicle device 10 that received the new route NR starts guidance on the new route NR. Specifically, the guidance part 15c of the predetermined in-vehicle device 10 provides the guidance on the new route NR of the subject-vehicle by displaying a positional icon representing a current position of the subject-vehicle, the new route NR, and the like to be superimposed over the map information (acquired from the map DB 16a of the data recording part 16) of the vicinity of the current position of the subject-vehicle on the display 13 (or the guidance part 15c may provides guidance on the new route NR by audio through the speaker 14). Such guidance on the new route NR in the in-vehicle device 10 is a known technology. Therefore, the detailed explanation is not given.

According to the present embodiment, when the new departure point NS and the new destination NG have been determined, the calculating part 25: extracts, from the past routes R, one or more past routes R that at least partly pass through the departure point area SA and at least partly pass through the destination area GA, calculates, with respect to each of the extracted one or more past routes R, the new candidate route NCR that sequentially passes through the calculated new departure point side section route NSR, the past section route RSG that is a route between the exit point CS and the entrance point CG on the extracted past route R, and the calculated new destination side section route NGR and computes the cost of the new candidate route NCR; and calculates the new candidate route NCR of which the computed cost is the smallest as the new route NR from the new departure point NS to the new destination NG. Therefore, as long as the one or more past routes R at least partly pass through the departure point area SA and the destination area GA, the new route NR can be calculated using the past routes R. Thereby, compared to a case in which new route calculation is performed using past routes R only when the new departure point NS or the new destination NG of the new route NR completely matches the past departure point S or the past destination G of the past route R, the past routes R can be surely utilized. Thus, the process load required to calculate a new route can be surely reduced.

In addition, the calculating part 25 calculates the new candidate route NCR based on only the route information of one or more past routes R that were calculated during a predetermined period of time just before calculating the new route NR. Therefore, it becomes possible to calculate a new route NR according to the situation at the time of calculation. For example, when a traffic disturbance is temporarily occurring at the moment, a relatively-old past route R is less likely to be a route that can avoid the traffic disturbance, and a relatively-new past route R is likely to be a route that can avoid the traffic disturbance. Therefore, it is possible to calculate the new route NR in a manner further preferable by using such a relatively-new past route R.

In addition, the calculating part 25, when a calculation condition of the new route NR has been determined, extracts one or more past routes R that were calculated under the same calculation condition as the determined calculation condition based on the calculation condition information stored in the route information DB 23b, and calculates the new candidate route NCR with respect to each of the extracted one or more past routes R. Therefore, for example, when a user desires to calculate a new route NR under a specific calculation condition, past routes R matching the specific calculation condition can be extracted and utilized. Thus, it is possible to calculate a new route NR that matches the user's needs.

In addition, the calculating part 25 extracts one or more past routes R, in which a road whose road type is highway forms at least the past section route RSG, based on the road type information stored in the map DB 23a or the route information DB 23b, and calculates the new candidate route NCR with respect to each of the extracted one or more past routes R. Therefore, for example, even when the distance from the new departure point NS to the new destination NG is relatively long, it is possible to calculate a new route NR of which the travel time is short and the fuel consumption is efficient using the past routes R formed by highway, compared to using the past routes R formed by roads other than highway.

In addition, the calculating part 25, when the new departure point NS and the new destination NG have been determined, computes a distance from the new departure point NS to the new destination NG, and only when the computed distance is equal to or more than a predetermined distance, calculates the new route NR based on the map information and the route information. Therefore, only when the process load required to calculate the new route NR is large, the calculation of the new route NR using one or more past routes R is performed. Thus, it is possible to prevent the occurrence of the problems of lowering the calculation accuracy or increasing the process load due to performing the calculation of the new route NR using the past routes R even when the process load is small.

While various features have been described in conjunction with the above embodiment, various modifications and/or improvements may be made to the configuration and/or features without departing from the broad spirit and scope of the underlying inventive principles. The examples of these alternatives are described below.

Aspects of particular embodiments of the inventive principles may vary depending on the environment and/or details of the configuration. Therefore, only a part of the problems described above may be solved, or only a part of the effects described above may be accomplished. Even when the calculating means calculates the new candidate route NCR with the smallest cost as the new route less accurately than before, if such calculation can be achieved by a technology different from the conventional technology, it means that the object is solved.

The electronic constituent elements described above are merely functional concepts, and need not be physically configured as illustrated in the drawings. That is, the specific form of division/integration of each portion is not limited to that shown in the drawings. The constituent elements, as a whole or in part, can be divided and/or integrated in any manner either functionally or physically based on various types of loads or use conditions. For example, the constituent elements of the route calculation system 1, as a whole or in part, may be combined in the in-vehicle device 10 of the vehicle.

In the aforementioned embodiment, it is explained that the vehicle is a concept including four-wheeled vehicles and the like. However, in addition to the four-wheeled vehicles, the vehicle may be a concept including two-wheeled vehicles, bicycles, and the like. In such case, the past route extraction process may be performed with respect to only the past routes R according to the vehicle type among the past routes R corresponding to the route information stored in the route information DB 23b. Specifically, when the vehicle type is a four-wheeled vehicle or a two-wheeled vehicle with an engine size of 125 cc or more, the process may be performed with respect to all past routes. On the other hand, when the vehicle type is a two-wheeled vehicle with an engine size of less than 125 cc (for example, a scooter) or a bicycle, the process may be performed with respect to the past routes R excluding highway. In such manner, the vehicle types and the available types of past routes (road types, calculation conditions, or the like) may be previously associated and recorded in the data recording part 16 and/or 23. When the vehicle type for which the present system is utilized is determined, the types of past route according to the vehicle type are acquired from the data recording part 16 and/or 23, the new route NR may be calculated using only the past routes matching the acquired types of past route.

In the aforementioned embodiment, it is explained that the information to determine the road type of a link is stored in the map DB 23a. However, embodiments are not limited thereto. For example, the information to determine the road type of a link may be stored in the route information DB 23b. Note that the information to determine the road type of a link corresponds to "road type information."

In the aforementioned embodiment, it is explained that the size of a section part is previously set. However, embodiments are not limited thereto. For example, the size of a section part may be changed according to the length of the distance from the new departure point NS to the new destination NG such that the process load can be further reduced and a route can be calculated with higher accuracy. Specifically, the map DB 23a stores a plurality of section parts with different sizes (for example, in addition to the section part with the aforementioned size (hereinafter, referred to as medium section part), a section having one side with a length on the map corresponding to an actual distance of 2 km and the other side with a length on the map corresponding to an actual distance of 2 km (hereinafter referred to as small section part) and a section having one side with a length on the map corresponding to an actual distance of 10 km and the other side with a length on the map corresponding to an actual distance of 20 km (hereinafter referred to as large section part). The control part 22 changes the size of a section part according to the length of the distance from the new departure point NS to the new destination NG such that, when the length of the distance is shorter than a predetermined distance range (for example, a range of 15 km to 50 km, etc.), the small section part is utilized, when the distance is within the predetermined distance rage, the medium section part is utilized, and when the distance is longer than the predetermined distance range, the large section part is utilized.

In the aforementioned embodiment, it is explained that the processes at SA2, SA3, and SA11 are performed. However, for example, all of the processes at SA2, SA3, and SA11 may not be performed.

In the aforementioned embodiment, it is explained that the process at SA6 is performed after the process at SA5. However, for example, the process at SA5 may be performed after the process at SA6.

In the aforementioned embodiment, it is explained that the past route extracting part 25a determines a section part that is a predetermined range area including the new departure point NS as the departure point area SA at SB1. However, embodiments are not limited thereto. For example, in order to make it possible to calculate the new route NR using the past routes R even when any past routes R cannot be extracted with respect to the departure point area SA, the past route extracting part 25a may determine as the departure point area SA the area combining one section part including the new departure point NS with at least a section part adjacent thereto (the same may be applied to the determination of the destination area GA at SB2).

In the aforementioned embodiment, it is explained that the processes at SB5 to SB7 are performed. However, embodiments are not limited thereto. For example, a part of the process at SB5 and SB6 may not be performed. Or, all of the processes at SB5 to SB7 may not be performed.

In the aforementioned embodiment, it is explained that the process at SB4 is performed after the process at SB3. However, for example, the process at SB3 may be performed after the process at SB4.

In the aforementioned embodiment, an example is explained, in which the past route extracting part 25a determines the past section route RSG using the past routes R whose road type of at least a part of the links is highway at SB6. However, the past route extracting part 25a may determine the past section route RSG using the past routes R whose road types of all links are highway.

Finally, features and effects of the embodiments described above will be partly exemplified below. However, the features and the effects of the embodiments are not limited to the following. The following effects may be partly achieved by including only a part of the following features. In addition, effects other than the following effects may be achieved by including a feature other than the following feature.

The route calculation system according to a first aspect of one of the embodiments includes: map information storing means for storing map information; route information storing means for storing route information that determines past routes from past departure points to past destinations; and calculating means for calculating a new route from a new departure point to a new destination, wherein the calculating means: when the new departure point and the new destination have been determined, extracts, from the past routes, one or more past routes that at least partly pass through a departure point area and at least partly pass through a destination area based on the map information stored by the map information storing means and the route information stored by the route information storing means, the departure point area being a predetermined range area including the new departure point, the destination area being a predetermined range area including the new destination; calculates, with respect to each of the extracted one or more past routes, a new departure point side section route that is a route from the new departure point to an exit point, the exit point being a point at which the extracted past route intersects with a border of the departure point area on a side of the past destination of the extracted past route; calculates, with respect to each of the extracted one or more past routes, a new destination side section route that is a route from an entrance point to the new destination, the entrance point being a point at which the extracted past route intersects with a border of the destination area on a side of the past departure point of the extracted past route; calculates, with respect to each of the extracted one or more past routes, a new candidate route that sequentially passes through the calculated new departure point side section route, a past section route, and the calculated new destination side section route, and computes a cost of the calculated new candidate route, the past section route being a route between the exit point and the entrance point on the extracted past route; and calculates the new candidate route of which the computed cost is the smallest as the new route from the new departure point to the new destination.

According to the route calculation system according to the first aspect, when the new departure point and the new destination have been determined, the calculating means: extracts, from the past routes, one or more past routes that at least partly pass through the departure point area and at least partly pass through the destination area; calculates, with respect to each of the extracted one or more past routes, the new candidate route that sequentially passes through the calculated new departure point side section route, the past section route that is a route between the exit point and the entrance point on the extracted past route, and the calculated new destination side section route and computes the cost of the calculated new candidate route; and calculates the new candidate route of which the computed cost is the smallest as the new route. Therefore, as long as the one or more past routes at least partly pass through the departure point area and the destination area, the new route can be calculated using the past routes. Thereby, compared to a case in which new route calculation is performed using past routes only when the new departure point or the new destination of the new route completely matches the past departure points or the past destinations of the past routes, the past routes can be surely utilized. Thus, the process load required to calculate a new route can be surely reduced.

In the route calculation system according to a second aspect of the embodiments, in the route calculation system according to the first aspect, the calculating means calculates the new candidate route based on only the route information of one or more past routes that were calculated during a predetermined period of time just before calculating the new route.

According to the route calculation system according to the second aspect, the calculating means calculates the new candidate route based on only the route information of one or more past routes that were calculated during a predetermined period of time just before calculating the new route. Therefore, it becomes possible to calculate a new route according to the situation at the time of calculation. For example, when a traffic disturbance such as a traffic jam is temporarily occurring at the moment, a relatively-old past route is less likely to be a route that can avoid the traffic disturbance, and a relatively-new past route is likely to be a route that can avoid the traffic disturbance. Therefore, it is possible to calculate a new route in a manner further preferable by using such a relatively-new past route.

In the route calculation system according to a third aspect of the embodiments, in the route calculation system according to the first or second aspect, the route information storing means stores calculation condition information that determines calculation conditions when the past routes were calculated, and the calculating means, when a calculation condition of the new route has been determined, extracts one or more past routes that were calculated under the same calculation condition as the determined calculation condition based on the calculation condition information stored by the route information storing means, and calculates the new candidate route with respect to each of the extracted one or more past routes.

According to the route calculation system according to the third aspect, the calculating means, when a calculation condition of the new route has been determined, extracts one or more past routes that were calculated under the same calculation condition as the determined calculation condition based on the calculation condition information stored by the route information storing means, and calculates the new candidate route with respect to each of the extracted one or more past routes. Therefore, for example, when a user desires to calculate a new route under a specific calculation condition, past routes matching the specific calculation condition can be extracted and utilized. Thus, it is possible to calculate a new route that matches the user's needs.

In the route calculation system according to a fourth aspect of the embodiments, in the route calculation system according to any one of the first to third aspects, the map information storing means or the route information storing means stores road type information that determines road types of roads forming the past routes, and the calculating means extracts one or more past routes, in which a road whose road type is highway forms at least the past section route, based on the road type information stored by the map information storing means or the route information storing means and calculates the new candidate route with respect to each of the extracted one or more past routes.

According to the route calculation system according to the fourth aspect, the calculating means extracts one or more past routes, in which a road whose road type is highway forms at least the past section route, based on the road type information stored by the map information storing means or the route information storing means and calculates the new candidate route with respect to each of the extracted one or more past routes. Therefore, for example, even when the distance from the new departure point to the new destination is relatively long, it is possible to calculate a new route of which the travel time is shorter and the fuel consumption is more efficient using the past routes formed by highway, compared to using the past routes formed by roads other than highway.

In the route calculation system according to a fifth aspect of the embodiments, in the route calculation system according to any one of the first to fourth aspects, the calculating means, when the new departure point and the new destination have been determined, computes a distance from the new departure point to the new destination, and only when the computed distance is equal to or more than a predetermined distance, calculates the new route based on the map information and the route information.

According to the route calculation system according to the fifth aspect, the calculating means, when the new departure point and the new destination have been determined, computes a distance from the new departure point to the new destination, and only when the computed distance is equal to or more than a predetermined distance, calculates the new route based on the map information and the route information. Therefore, only when the process load required to calculate the new route is large, the calculation of the new route using one or more past routes is performed. Thus, it is possible to prevent the occurrence of the problems of lowering the calculation accuracy and/or increasing the process load due to performing the calculation of the new route using the past routes even when the process load is small.

The invention claimed is:

1. A route calculation system for a vehicle, the route calculation system comprising:
   a memory that stores:
      map information;
      route information including past routes, the past routes being routes traveled by the vehicle in the past from past departure points to past destinations; and
      a route calculation program; and
   a processor that, when executing the stored program:
      determines a new departure point and a new destination for a new route;
      extracts, from the stored past routes, one or more stored past routes that at least partly pass through a departure point area and at least partly pass through a destination area according to the stored map information and the stored route information, the departure point area being a range area including the new departure point, the destination area being a range area including the new destination;

calculates, for each of the extracted past routes, a new departure point side section route that is a route from the new departure point to an exit point, the exit point being a point at which the extracted past route intersects with a border of the departure point area on a side of the past destination of the extracted past route;

calculates, for each of the extracted past routes, a new destination side section route that is a route from an entrance point to the new destination, the entrance point being a point at which the extracted past route intersects with a border of the destination area on a side of the past departure point of the extracted past route;

assembles, for each of the extracted past routes, a new candidate route that sequentially includes the following three sections:
the calculated new departure point side section route;
a past section route that is a part of the extracted past route between the exit point and the entrance point; and
the calculated new destination side section route;

computes a cost of each calculated new candidate route;

sets, as the new route from the new departure point to the new destination, the new candidate route having the smallest computed cost; and outputs the new route for display on a display in the vehicle.

2. The route calculation system according to claim 1, wherein the processor, when executing the stored program:
calculates each new candidate route based on only the stored route information of one or more past routes that were calculated during a predetermined period of time just before calculating the new route.

3. The route calculation system according to claim 1, wherein:
the memory stores calculation condition information including calculation conditions when the past routes were calculated; and
the processor, when executing the stored program:
determines a calculation condition of the new route; and
based on the stored calculation condition information, extracts one or more stored past routes that were calculated under the same calculation condition as the determined calculation condition; and
calculates a new candidate route for each of the extracted one or more past routes that were calculated under the same calculation condition.

4. The route calculation system according to claim 1, wherein:
the memory stores road type information including road types of roads forming the past routes; and
the processor, when executing the stored program:
based on the stored road type information, extracts one or more past routes, in which a road whose road type is highway forms at least the past section route; and
sets the new route from among each of the extracted past routes having the road whose road type is highway forming at least the past section.

5. The route calculation system according to claim 1, wherein the processor, when executing the stored program:
when the new departure point and the new destination have been determined, computes a distance from the new departure point to the new destination; and
only when the computed distance is equal to or more than a predetermined distance, sets the new route based on the stored map information and the stored route information.

6. A route calculation method for a vehicle, the method comprising:
accessing, with a processor, map information;
accessing, with the processor, route information including past routes, the past routes being routes traveled by the vehicle in the past from past departure points to past destinations;
determining, with the processor, a new departure point and a new destination for a new route;
extracting, with the processor, from the stored past routes, one or more stored past routes that at least partly pass through a departure point area and at least partly pass through a destination area according to the stored map information, the departure point area being a range area including the new departure point, the destination area being a range area including the new destination;
calculating, with the processor, for each of the extracted past routes, a new departure point side section route that is a route from the new departure point to an exit point, the exit point being a point at which the extracted past route intersects with a border of the departure point area on a side of the past destination of the extracted past route;
calculating, with the processor, for each of the extracted past routes, a new destination side section route that is a route from an entrance point to the new destination, the entrance point being a point at which the extracted past route intersects with a border of the destination area on a side of the past departure point of the extracted past route;
assembling, with the processor, for each of the extracted past routes, a new candidate route that sequentially includes the following three sections:
the calculated new departure point side section route;
a past section route that is a part of the extracted past route between the exit point and the entrance point; and
the calculated new destination side section route;
computing, with the processor, a cost of each calculated new candidate route;
setting, with the processor, as the new route from the new departure point to the new destination, the new candidate route having the smallest computed cost; and
outputting, with the processor, the new route for display on a display in the vehicle.

7. A computer-readable storage medium storing a computer-executable route calculation program for a vehicle, the program comprising:
instructions for accessing map information;
instructions for accessing route information including past routes, the past routes being routes traveled by the vehicle in the past from past departure points to past destinations;
instructions for determining a new departure point and a new destination for a new route;
instructions for extracting, from the stored past routes, one or more stored past routes that at least partly pass through a departure point area and at least partly pass through a destination area according to the stored map information, the departure point area being a range area including the new departure point, the destination area being a range area including the new destination;

instructions for calculating, for each of the extracted past routes, a new departure point side section route that is a route from the new departure point to an exit point, the exit point being a point at which the extracted past route intersects with a border of the departure point area on a side of the past destination of the extracted past route;

instructions for calculating, for each of the extracted past routes, a new destination side section route that is a route from an entrance point to the new destination, the entrance point being a point at which the extracted past route intersects with a border of the destination area on a side of the past departure point of the extracted past route;

instructions for assembling, for each of the extracted past routes, a new candidate route that sequentially includes the following three sections:

the calculated new departure point side section route;

a past section route that is a part of the extracted past route between the exit point and the entrance point; and the calculated new destination side section route;

instructions for computing a cost of each calculated new candidate route;

instructions for setting, as the new route from the new departure point to the new destination, the new candidate route having the smallest computed cost; and instructions for outputting the new route for display on a display in the vehicle.

\* \* \* \* \*